(12) United States Patent
DeLuca (10) Patent No.: US 7,150,408 B2
(45) Date of Patent: Dec. 19, 2006

(54) PROGRAMMABLE THERMOSTAT INCORPORATING AIR QUALITY PROTECTION

(75) Inventor: Michael R. DeLuca, Mt. Laurel, NJ (US)

(73) Assignee: Lux Products Corporation, Mount Laurel, NJ (US)

( * ) Notice: Subject to any disclaimer, the term of this patent is extended or adjusted under 35 U.S.C. 154(b) by 123 days.

(21) Appl. No.: 10/847,564

(22) Filed: May 17, 2004

(65) Prior Publication Data

US 2004/0256472 A1 Dec. 23, 2004

Related U.S. Application Data

(63) Continuation-in-part of application No. 10/657,461, filed on Sep. 8, 2003, now Pat. No. 6,988,671.

(60) Provisional application No. 60/467,942, filed on May 5, 2003.

(51) Int. Cl.
*G05D 23/00* (2006.01)
*F23N 5/20* (2006.01)
*F25B 19/00* (2006.01)

(52) U.S. Cl. ................... 236/94; 236/46 R; 62/157; 62/231

(58) Field of Classification Search ............... 236/94, 236/46 R, 46 C, 46 F; 62/157, 231
See application file for complete search history.

(56) References Cited

U.S. PATENT DOCUMENTS

| | | | |
|---|---|---|---|
| 2,495,861 A | 1/1950 | Newton | |
| 2,882,383 A | 4/1959 | Boyd, Jr. et al. | |
| 3,454,078 A | 7/1969 | Elwart | |
| 3,635,044 A | 1/1972 | Heth | |
| 3,948,438 A | 4/1976 | Vlasak | |
| 4,011,735 A | 3/1977 | Martz et al. | |
| 4,075,864 A | 2/1978 | Schrader | |
| 4,136,822 A | 1/1979 | Felter | |
| 4,167,966 A | 9/1979 | Freeman | |
| 4,267,967 A | 5/1981 | Beck et al. | |
| 4,356,962 A | 11/1982 | Levine | |
| 4,369,916 A | 1/1983 | Abbey | |
| 4,408,711 A | 10/1983 | Levine | |
| 4,449,375 A | 5/1984 | Briccetti | |
| 4,452,391 A | 6/1984 | Chow | |
| 4,467,617 A | 8/1984 | Morgan, Jr. et al. | |
| 4,502,625 A | 3/1985 | Mueller | |
| 4,567,939 A | 2/1986 | Dumbeck | |
| 4,595,139 A | 6/1986 | Levine | |
| 4,684,060 A | 8/1987 | Adams et al. | |
| 4,718,021 A | 1/1988 | Timblin | |

(Continued)

FOREIGN PATENT DOCUMENTS

JP 61-8544 1/1986

OTHER PUBLICATIONS

AirCycler™ STAT & combo STAT (www.Aircycler.com) Brochure.

(Continued)

*Primary Examiner*—Marc Norman
(74) *Attorney, Agent, or Firm*—DLA Piper US LLP (57) ABSTRACT

The invention is directed to programmable temperature control in which a controller may be programmed to control a thermal output of said temperature-modifying device, and to operate an air circulating system independently of the temperature-modifying device. The apparatus may incorporate a user input for entering air handling information to program the air circulating system to operate at predetermined intervals. The controller may be further programmed to receive air filtration information from the user input and to generate air filtration output information. A display provides access to the air filtration output information.

17 Claims, 8 Drawing Sheets

U.S. PATENT DOCUMENTS

| | | |
|---|---|---|
| 4,773,587 A | 9/1988 | Lipman |
| 4,838,482 A | 6/1989 | Vogelzang |
| 4,930,460 A | 6/1990 | Aihara et al. |
| 4,941,325 A | 7/1990 | Nuding |
| 4,951,473 A | 8/1990 | Levine et al. |
| 5,020,332 A | 6/1991 | Nakatsuno et al. |
| 5,107,918 A | 4/1992 | McFarlane et al. |
| 5,131,236 A | 7/1992 | Wruck et al. |
| 5,142,880 A | 9/1992 | Bellis |
| 5,179,524 A | 1/1993 | Parker et al. |
| 5,239,834 A | 8/1993 | Travers |
| 5,241,253 A | 8/1993 | Schlangen |
| 5,289,362 A | 2/1994 | Liebl et al. |
| 5,325,286 A | 6/1994 | Weng et al. |
| 5,544,809 A | 8/1996 | Keating et al. |
| 5,547,017 A | 8/1996 | Rudd |
| 5,676,196 A | 10/1997 | Jakubzick et al. |
| 5,697,224 A * | 12/1997 | Sumida .................. 62/125 |
| 5,718,372 A | 2/1998 | Tishler |
| 5,850,968 A | 12/1998 | Jokinen |
| 5,881,806 A | 3/1999 | Rudd |
| 6,466,132 B1 * | 10/2002 | Caronna et al. ............ 340/584 |
| 6,715,302 B1 * | 4/2004 | Ferragut, II .................. 62/129 |
| 2004/0201485 A1 * | 10/2004 | Dermody .................... 340/607 |
| 2004/0245352 A1 * | 12/2004 | Smith .......................... 236/94 |
| 2005/0103875 A1 * | 5/2005 | Ashworth et al. ............ 236/94 |

OTHER PUBLICATIONS

Advanced Controls: AirCycler Model FR Brochure.
Air Cycler™ (www.AirCycler.com) Brochure.
Advanced Controls: AirCycler Model FR-V Brochure.
AirCycler, the indoor air quality solution (www.aircycler.com) Brochure.
AirCycler STAT & combo STAT Brochure.
AirCycler® (www.AirCycler.com) Brochure.

* cited by examiner

PROGRAMMABLE THERMOSTAT INCORPORATING AIR QUALITY PROTECTION

CROSS-REFERENCE TO RELATED APPLICATIONS

This application claims priority of U.S. patent application Ser. No. 10/657,461, filed on Sep. 8, 2003, now U.S. Pat. No. 6,988,671 and U.S. Provisional Patent Application Ser. No. 60/467,942, filed on May 5, 2003, which are herein incorporated in their entirety by reference.

FIELD OF THE INVENTION

This invention relates to programmable thermostats for controlling a heating and/or cooling system to maintain predetermined set point temperatures and, more particularly, to programmable thermostats that incorporate air quality protection features.

BACKGROUND

It has been a longstanding problem in the heating and cooling of homes and offices to efficiently regulate the ambient temperature to maintain the desired comfort level, while minimizing the amount of energy expended by the heating/cooling apparatus. The heating/cooling needs of a home or office are not constant over time and may, in fact, vary substantially depending on the time of day or day of the week. Conventional thermostats have been inefficient due to the fact that only one set temperature could be maintained.

Programmable thermostats were developed that allowed for programming set points for the thermostat based on the time of day or day of the week. These programmable thermostats utilize a microprocessor into which the user inputs the desired temperature setting information by way of a keypad or some other arrangement of buttons and switches.

Air handling systems for use in temperature control, such as in residential or commercial heating ventilation and air conditioning ("HVAC") systems, typically utilize an air filtration system, typically incorporating a furnace or air conditioning filter, to collect airborne particles that may be circulating in the system. The use of a filtration system helps to reduce the build up of allergens (such as pollen, mold, spores, dander, etc.) and other material within the ductwork that circulates air through the system, and helps to remove these particulates from the air. The presence of such material may greatly reduce the efficiency of the temperature control system itself, in addition to posing health risks to those inhabiting the environmentally controlled space. Maintaining the efficiency of the filter through proper changing or cleaning of the filter is particularly important in some systems, such as those incorporating the use of heat pumps.

In the past, some programmable thermostats have included a filter counter that works in the background while the thermostat is in operation. A "FILTER" message appears on the thermostat display when the designated usage period for the filter has elapsed. No information about the filter usage is available to the user during normal operation of the thermostat. Instead, the user must switch the thermostat to a filter mode to set or reset the filter usage period (typically from 0 to 500 hours) and viewing the time remaining in the filter usage period.

Moreover, the amount of allergens and other particulates present in the ductwork for the air circulating system may be reduced by operating the fan that circulates the air on a regular basis. Operating the fan at independent regular intervals (as opposed to continuously or only when then the furnace or cooling system are operating) can more effectively clean the air used in the system, while also conserving energy usage and extending the life of the air handling unit. However, this is not done in the systems of the prior art.

Accordingly, a temperature control system is needed that further enhances the cleaning of air circulating through an environmental control system.

SUMMARY OF THE INVENTION

This invention relates to a programmable temperature control apparatus for the control of temperature in communication with a temperature-modifying device and an air circulating system including a user-operable input connected for entering air filter duration input information; a controller programmed to control a thermal output of the temperature-modifying device to achieve a desired temperature, and generate air filter duration output information based upon the air filter duration input information entered at the user-operable input and the length of time that the air circulating system has operated subsequent to resetting prior air filter duration output information; and a display for displaying the air filter duration output information.

This invention also relates to a programmable temperature control apparatus for the control of temperature in communication with a temperature-modifying device and an air circulating system including a user-operable input connected for entering air filter duration input information; a controller programmed to control a thermal output of said temperature-modifying device to achieve a desired temperature, and to generate air filter output information based upon the air filter duration input information entered at the user-operable input and a length of time subsequent to resetting prior air filter duration output information; and a display for displaying the air filter output information during the control of the thermal output of the temperature-modifying device.

This invention further relates to a programmable temperature control apparatus for the control of temperature in communication with a temperature-modifying device and an air circulating system including a list of air filter identifiers; a user-operable input connected for selecting an air filter identifier from the list; a controller programmed to control a thermal output of the temperature-modifying device to achieve a desired temperature, and to generate air filter output information based upon the selected air filter identifier at the user-operable input; and a display for displaying the air filter output generation information during the control of the thermal output of the temperature-modifying device.

BRIEF DESCRIPTION OF THE DRAWINGS

The foregoing and other aspects and advantages will be better understood from the following detailed description of the invention with reference to the drawings, in which.

DETAILED DESCRIPTION

The invention will be understood more fully from the detailed description given below and from the accompanying drawings of seleted embodiments of the invention; which, however, should not be taken to limit the invention to a specific embodiment, but are for explanation and understanding only.

Figure 1:
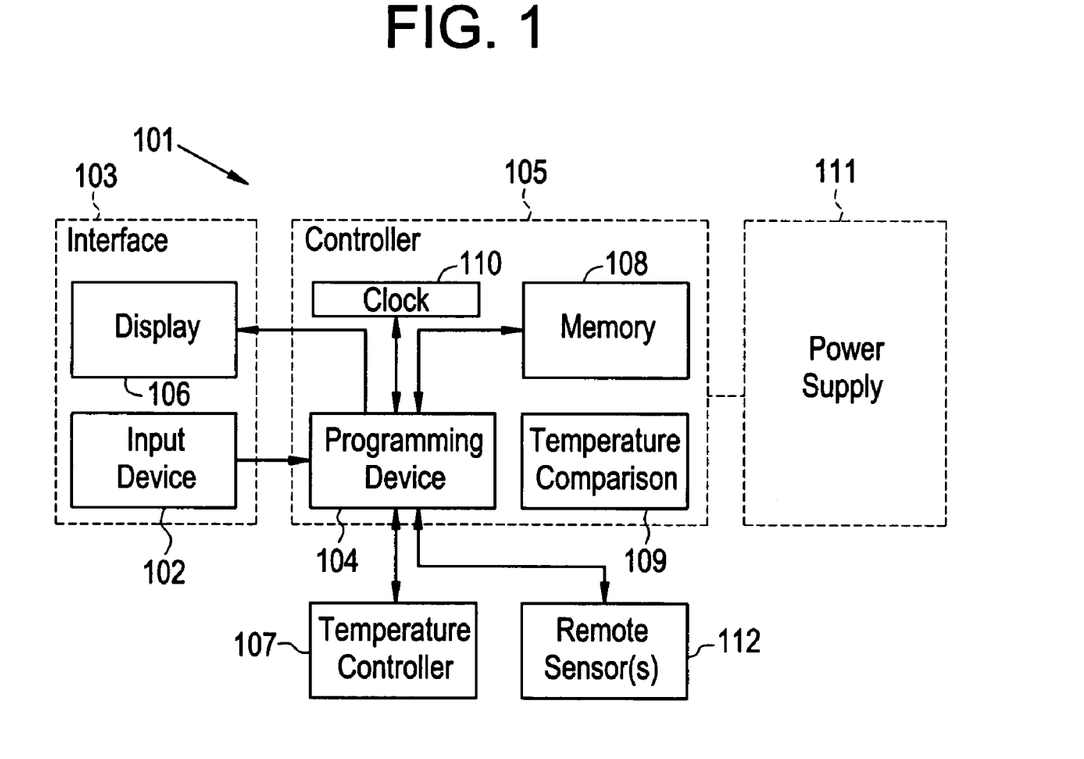
FIG. 1 is a block diagram of a programmable thermostat.

FIG. 1 contains a block diagram of an embodiment of a programmable thermostat. Those of ordinary skill in the art will appreciate that the invention is not limited thereto and may comprise any device or configuration of components capable of operating in the manner of the invention. In the embodiment disclosed herein, information regarding the desired set point temperature, date, or time for each program may be inputted to thermostat 101 by the user through input device 102 in interface 103. Interface 103 may be connected to a programming device 104 of controller 105 in such a way that programming device 104 receives information inputted at input device 102, and may display this information on display device 106.

Programming device 104 may also control operation of a temperature-modifying device 107, which is typically a heating/cooling system for the medium whose temperature is being controlled, such as HVAC systems, geothermal systems, gas, natural gas, or electric furnaces or water heaters and the like. Programmable device 104 may store information received from input device 102 in memory 108, along with an algorithm or program for operating temperature-modifying device 107 in accordance with this information.

Programming device 104 may comprise any device capable of operating in the manner of the invention, such as a logic circuit on a logic board, a microprocessor, or other integrated circuit. Similarly, memory 108 may comprise electronic memory, such as RAM, SRAM, or DRAM and the like, in an integrated circuit, such as a PROM, EPROM, or EEPROM and the like. Memory 108 may also form part of programming device 104. Display device 106 is also not particularly limited and may comprise, for example, an electronic display, such as an LCD, LED and the like. Input device 102 may include pressure sensitive buttons, keypads or any other device or arrangement of devices that are capable of entering the appropriate information. The operation of such devices is well known to those of ordinary skill in the art.

A comparison device 109 may be used to compare ambient temperature of the medium to be controlled with the desired control temperature, as determined by programming device 104 and stored in memory 108. Comparison device 109 may detect the current ambient temperature by using a conventional temperature-sensing device such as a thermistor, thermocouple or other type of temperature transducer.

A clock 110 may be connected with programming device 104 to provide time related information thereto for use in connection with operation of programming device 104 and its program of temperature control. Time related information from clock 110 may also be stored in memory 108 and shown on display 106. Clock 110 may comprise any device for providing time related information such as a voltage controlled oscillator (VCO), crystal oscillator and the like, along with associated circuitry. The time related information provided by clock 110 is not limited and may comprise, for example, chronological time information such as year, month, day, hour, minutes, and/or seconds, or synchronization information for programming device 104 (which may be used to calculate this information). Clock 110 may also form a part of programming device 104.

One or more remote sensors 112 may be used in communication with controller 105 to provide feedback information to programming device 104. For example, sensors may be used about the air filter to detect air pressure, air flow or heat loss. In another example, sensors may also be used to detect fan operation such as by detecting fan current draw. Information may be transmitted to and from the sensor using any number of mechanisms such as wireless systems (e.g., radio frequency or infrared), low voltage communication cabling or even household wiring. The invention is not limited in this regard. The use of such sensors is discussed in more detail below in regard to monitoring fan and filter usage.

The operation of controller 105 and/or interface 103 may be powered by power supply 111. Power supply 111 is not particularly limited, but may comprise any source of power capable of operating controller 105 and interface 103 such as household current (e.g., 120v AC at 60 Hz) or one or more batteries (e.g., 9v DC).

Figure 2:
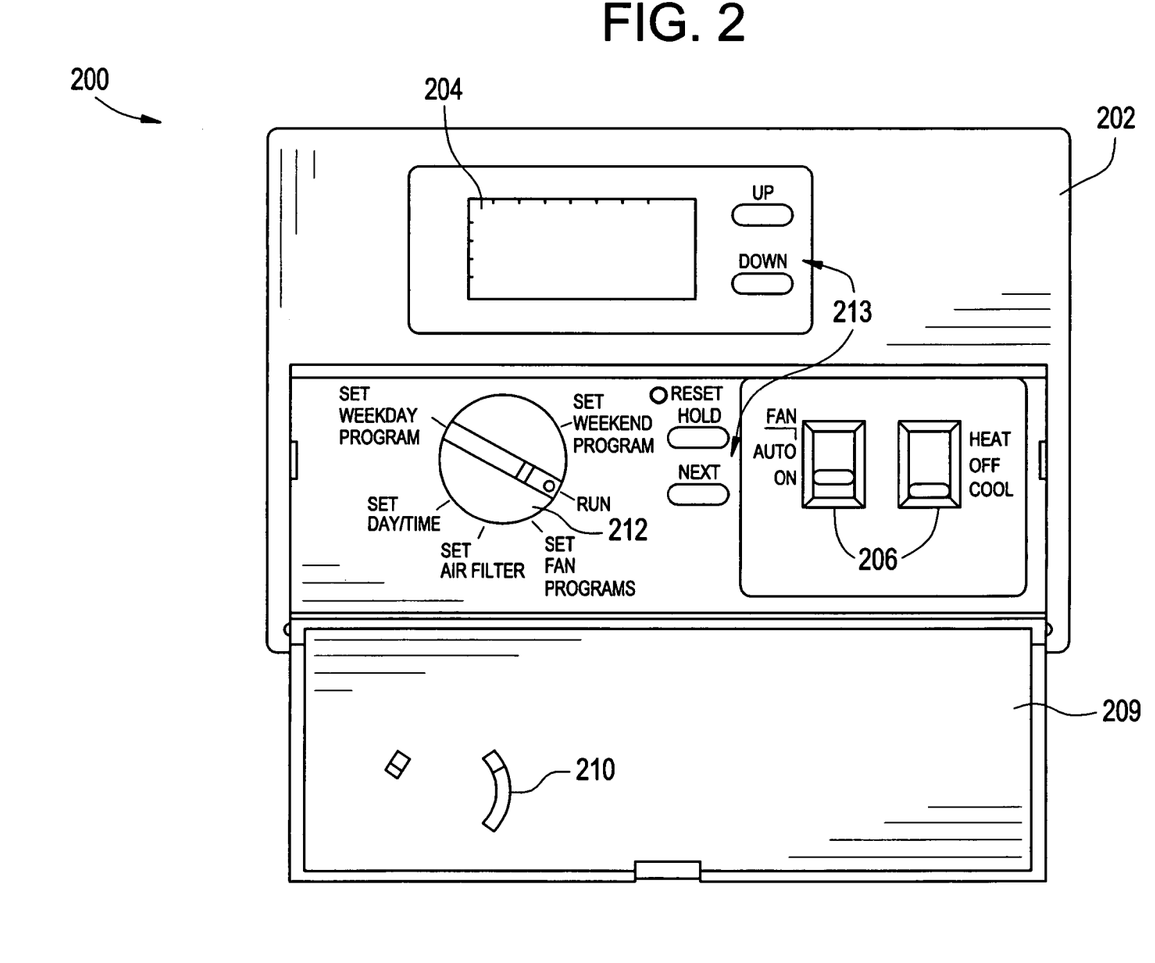
FIG. 2 is a front elevation of a programmable thermostat.

FIG. 2 illustrates an example of a programmable thermostat. Thermostat 200 may include an outer casing 202 to house the aforementioned components. Display window 204 maybe used for housing display 106 (FIG. 1) for interaction with the user. Switches 206 may be used for switching between heating and cooling modes or for switching an air handling fan from automatic mode to a constant "on" mode. Buttons 213 may further be used for inputting information into the thermostat with information being presented through display window 204. Switches 206 and buttons 213 may be in communication with input device 102 (FIG. 1) to input information into the programmable thermostat. These aspects of programmable thermostats temperature control are well known in the art and will not be further elaborated upon.

Thermostat 200 may also include rotary dial 212 or some other mechanism to switch between operation modes of the thermostat such as setting the day and time, setting weekday and weekend functions, setting the filter, and running, and may also be in communication with input device 102. Those of ordinary skill in the art will appreciate that it is not necessary to use a rotary dial and that any other mechanism such as a combination of switches and buttons may be used to achieve the functionality described herein.

As previously noted, air handling systems for use in temperature control, such as in residential or commercial HVAC systems, typically utilize one or more filters, such as High Efficiency Particulate Air (or "HEPA") filter, electrostatic filters and the like to collect airborne particulates that may be circulating in the system. These filters typically comprise a tight web or fine mesh of material placed within an air register or ductwork through which air is passed by the air handling fan or blower. Airborne particles are trapped with the fibers of the filter weave as air is passed through the filter. Such filter systems are beneficial in reducing the spread of allergens such as pollen, mold, spores, dander and the like throughout a home or office.

However, the efficiency of the temperature control system may be greatly reduced if an air handling system is not properly maintained, reducing its ability to adequately clean the circulated air. For example, a filter that is not changed or cleaned regularly may become clogged from a build up of particulate matter, reducing airflow through the system and increasing the amount of allergens within the ductwork. These additional allergens may consequently be circulated through the system even once a filter is replaced. Also, reduced or inconsistent airflow may allow allergens to collect in the system ductwork.

The thermostat may be programmed to operating the air handler in a cleaning cycle to further enhance the cleaning of air circulating through the system, which circulates air through the system at determined intervals to prevent the buildup and growth of allergens within the ductwork of the temperature control system.

In one embodiment, an air clean time control program may be operating as part of programming device 104 The user may rotate the dial (or equivalent) to the SET FAN PROGRAMS position to set user-definable parameters for the program. FAN slide switch (206) may be set to the FAN CLEAN position and MODE slide switch (206) may be set to the HEAT or COOL positions.

In one embodiment, the air clean time control program may incorporate one or more default program periods, during which the fan may be operated for a set duration such as 15 minutes of ON time per each hour. Thus, for example, each day may have one or more periods during which the fan is turned on for a set amount of time to circulate air through the system and help prevent the buildup and growth of allergens—regardless of the operation of the temperature modifying device itself. Several examples of such periods are listed in Table 1 below.

TABLE 1

| Default PERIODS | Monday Through Sunday START TIME |
|---|---|
| MORN | 6:00 AM (6:00) |
| DAY | 8:00 AM (8:00) |
| EVE | 6:00 PM (18:00) |
| NIGHT | 10:00 PM (22:00) |

While the manner of programming the air cleaning cycles is not particularly limited, in one embodiment, programming may be performed in the following order: Mon Morn Start Time, Mon Morn Minimum ON Time, Mon Day Start Time, Mon Day Minimum ON Time, and so on until Sun Night is fully programmed. At this point, pressing [NEXT] again may begin the list at Mon Morn Start Time. Information may be displayed on display 106 for the user during the programming process. For example, "PROGRAM","FAN", "START AT" icons may go solid along with appropriate "MO" (Monday) day and "MORN" period icons. The current period of start time being programmed may flash in the time section.

A user may press and release the [UP] button to increment time in intervals, e.g., 15 minutes to change a default setting. The user can also press and release [DOWN] button to decrements time intervals. Alternatively, the user may press and hold the [UP] or the [DOWN] button to change the time at a preset rate such as 60 minutes/second.

The user may press and release the [NEXT] button to advance to set minimum fan ON time (e.g., in hours). On display 106, the "PROGRAM" and "FAN" icons may go solid along with the appropriate "MO" day and "MORN" period to indicate the change to the user. The current set minimum time may flash with an icon such as "MIN/HR". The user may then adjust the value of minimum on time per hour (in minutes or seconds, for example).

In one embodiment, the value may be changed from 9 minutes to 60 minutes in increments of 3 minutes. The user may then press and release the [UP] or the [DOWN] button to alter the minimum ON Time setting by 3 minutes. The user may press [NEXT] to go to the next program period, and after all 4 programs period of a day have been programmed, pressing next may go to the next day "MORN".

The user may also copy programs of previous day into the current day and then advance to the next day's Morning program. For example, the user may copy the Friday's Morning program setting to Saturday's Morning program setting. The user may rotate the dial (or equivalent) away from the SET FAN PROGRAMS position when finished programming the air cleaning program cycle.

A filter counter may also be used to help ensure proper maintenance of the system filters. In one embodiment, a filter counter may be programmed into programming device 104 utilizing clock 110 and display 106. In one embodiment, the filter counter may comprise a three-digit counter, which may count from 000 to 999 days for example. The period of the count may be set by the user, as described in more detail below. The filter counter may increment, for example, by one day at 12:00 midnight each day. The filter counter may even include a default period such as 90 days, although the invention is not limited thereto.

FIGS. 3(a)–(d) incorporate samples of display 106 (FIG. 1) that illustrate the operation of a filter counter in accordance with the invention. As illustrated in FIGS. 3(a)–(d), in run mode, display 106 may show the number of days left before the filter needs to be changed at numerical indicator 302. The amount of the filter period spent may also be graphically illustrated such as with bar indicator 304. Indicator 306 shows the user that the filter counter is in operation. A CURRENT TIME/TEMPERATURE section 308 may display current time and/or temperature information. PROGRAM section 310 and TEMP section 312 may also be included, which show the currently operating program information and set point temperature.

Figure 3A:
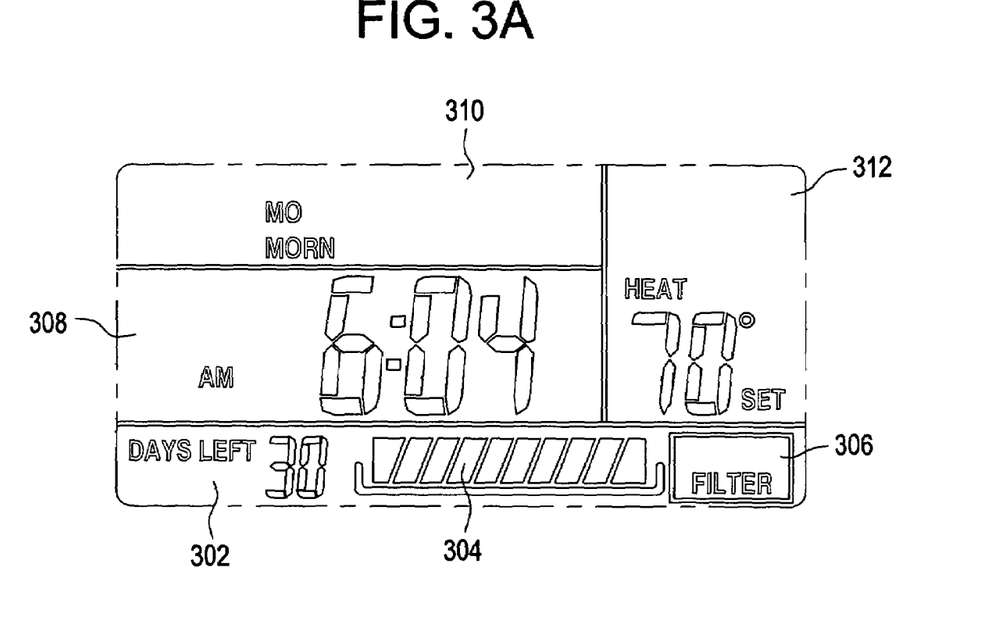
FIGS. 3(a)–(d) are illustrations of a programmable thermostat display.
Figure 3B:
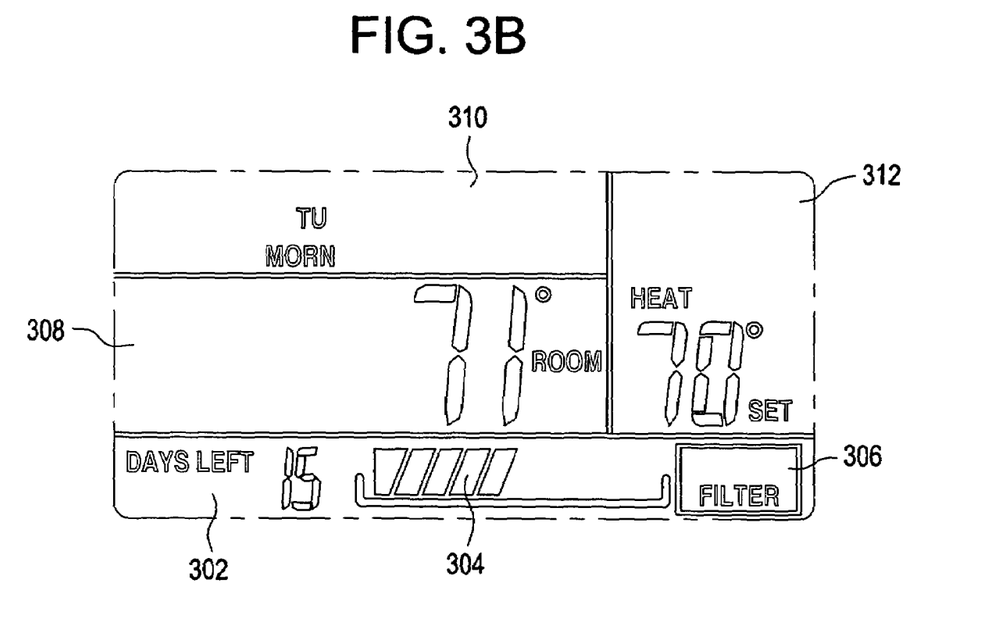
Figure 3C:
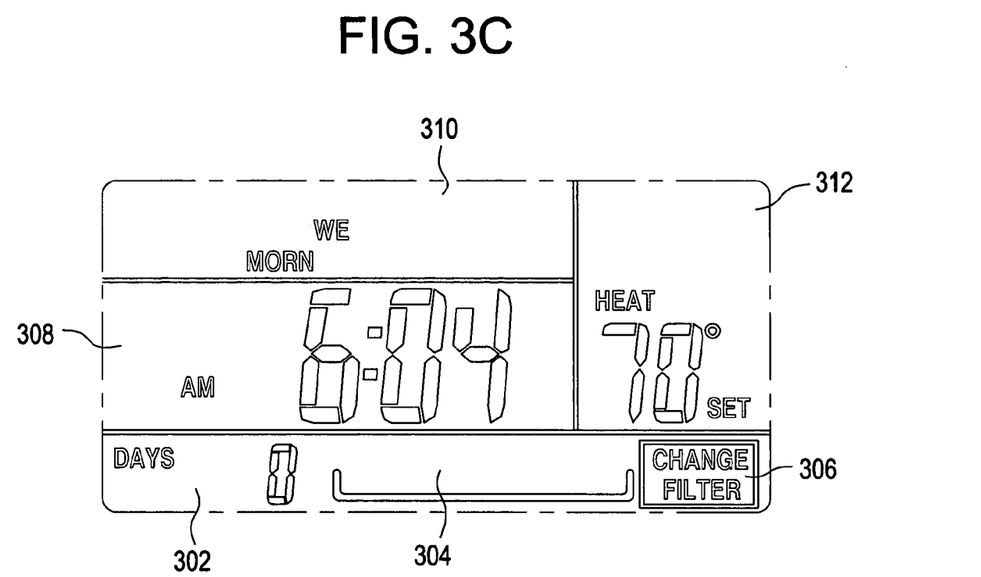

As shown in FIG. 3(a), the filter usage may start at 100% on bar indicator 304. In this example, the filter usage has been set to thirty days, as indicated by numerical indicator 302. As the counter counts down, the number of days may be decremented on numerical indicator 302 as shown in FIG. 3(b). Bar indicator 304 may likewise indicate the percentage of filter life remaining. When the filter counter has decremented to zero (indicating the end of the set filter period), Indicator 306 may now flash a "change filter" message, which demonstrates to the user that the filter should be changed or cleaned.

Figure 3D:
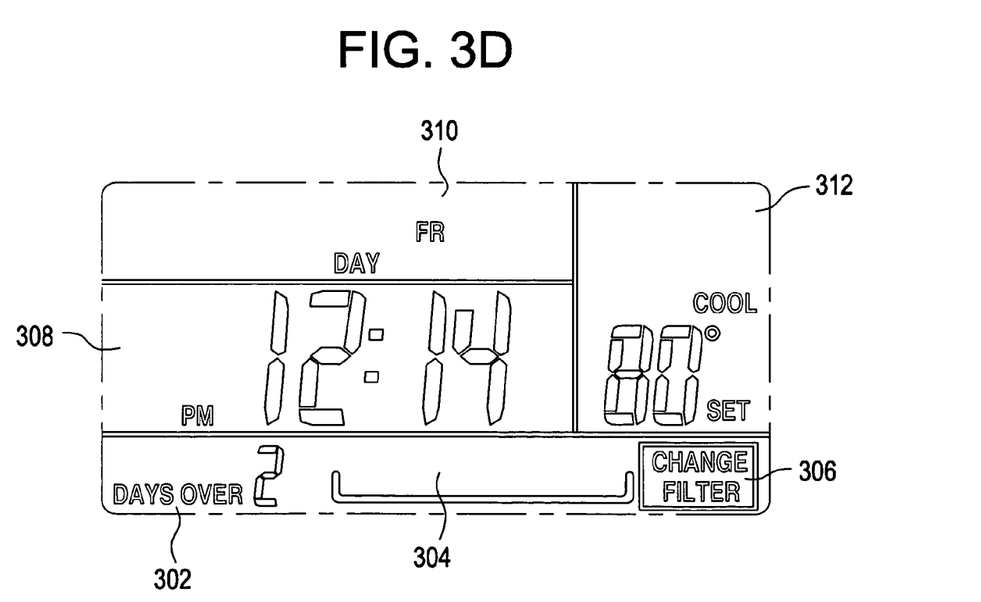

In one embodiment, the filter counter may continue to count beyond the end of the filter usage period. One example of this is illustrated in FIG. 3(d). Numerical indicated 302 may now increment the number days that have elapsed since the end of the filter usage period (e.g., "DAYS OVER"). Indicator 306 may also continue to flash the "CHANGE FILTER" message.

Figure 4A:
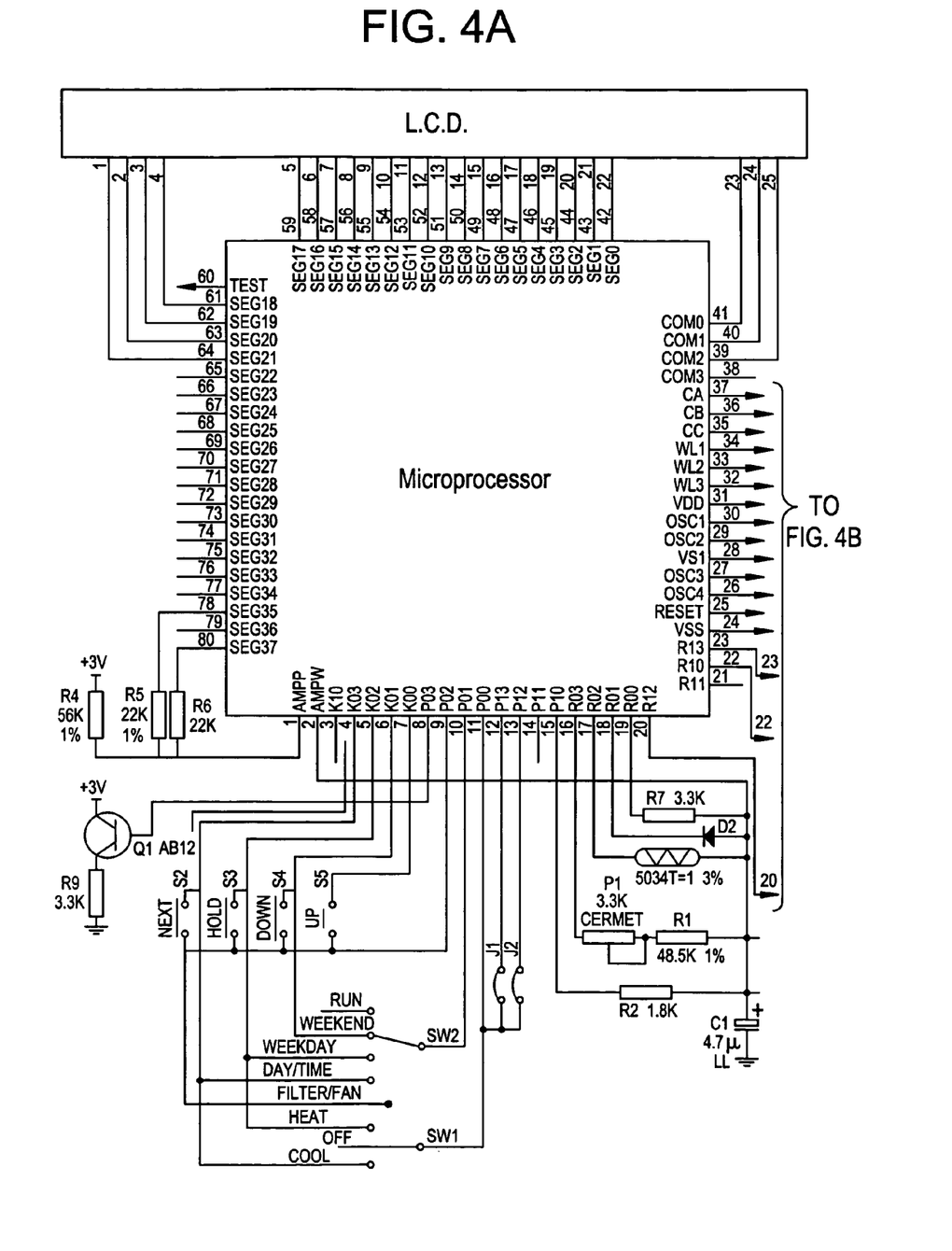
FIGS. 4(a)–(b) are a schematic of a programmable thermostat.
Figure 4B:
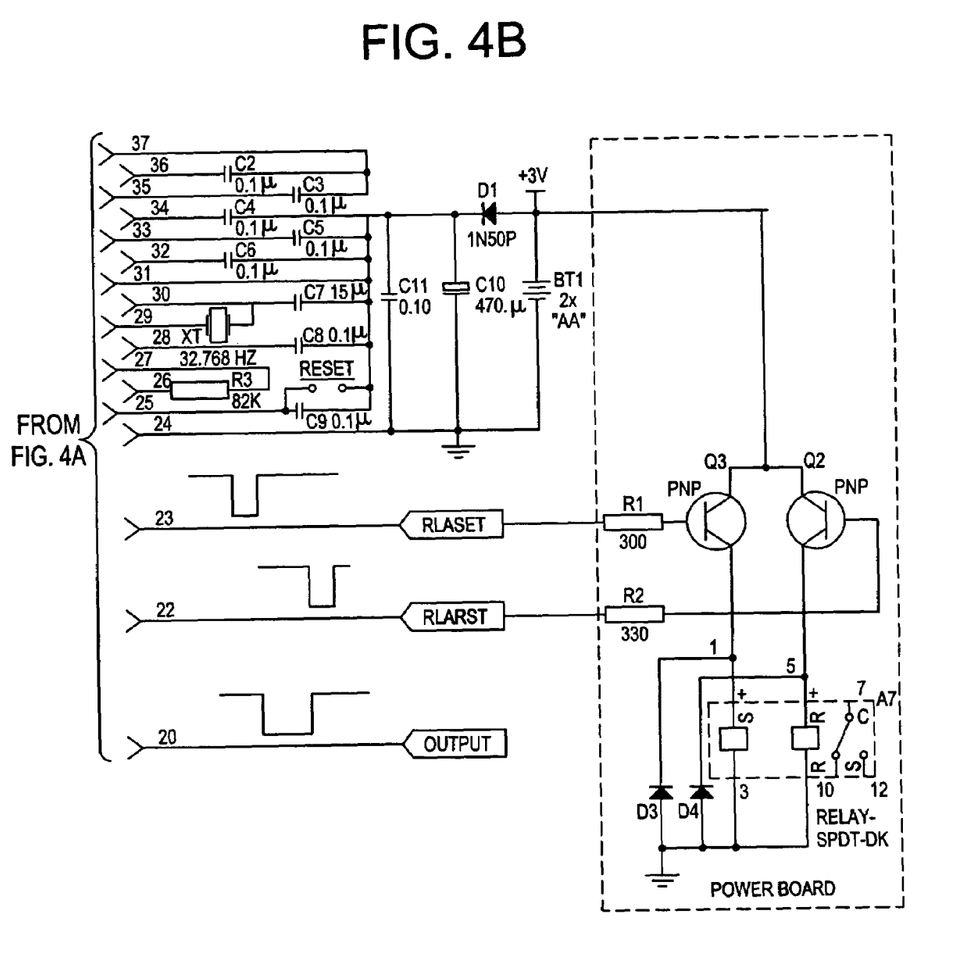

A schematic of an embodiment of a controller 105 for use with the aforementioned temperature control, fan control, and filter usage counter is illustrated in FIGS. 4(a)–(b). A microprocessor may be powered by a DC power board and, in turn, power an LCD display. The microprocessor may have a plurality of outputs to individual segments on the LCD display to output information thereto to be viewed by the user. The microprocessor may also include the plurality of inputs/outputs to a temperature modifying device and to a series of switches (e.g., next, hold, down and up). One of these switches SW2, may be selectable in this example between a weekday program, a weekend program, date and time selection, setting the fan control information, setting the filter control information, and running or operating the thermostat. By selecting one of these positions in SW2, the user may designate which aspect of the programming (e.g., temperature control, fan control, filter usage, etc.) setting may be inputted into the microprocessor using the remaining switches. Those of ordinary skill in the art will appreciate that this is only one possible embodiment of the invention and is not limited thereto.

The user may rotate dial 212 (or whatever equivalent mechanism is being used) to the SET AIR FILTER position to set the filter usage period in controller 105. Programmable device 104 of controller 105 is now in the air filter setting mode of its programming.

Figure 5A:
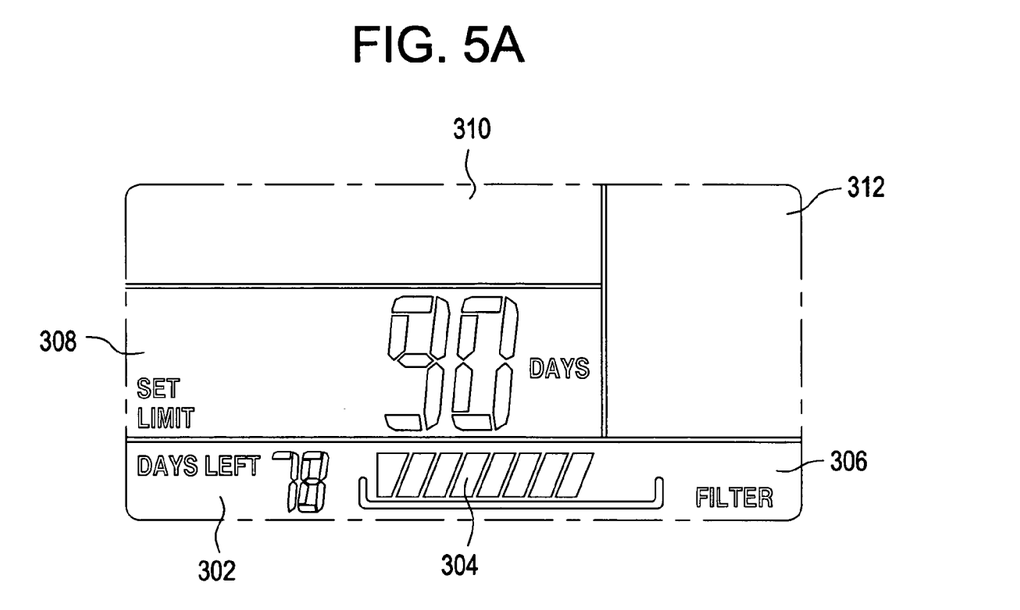
FIGS. 5(a)–(b) are illustrations of a programmable thermostat display for setting a filter usage counter.
Figure 5B:
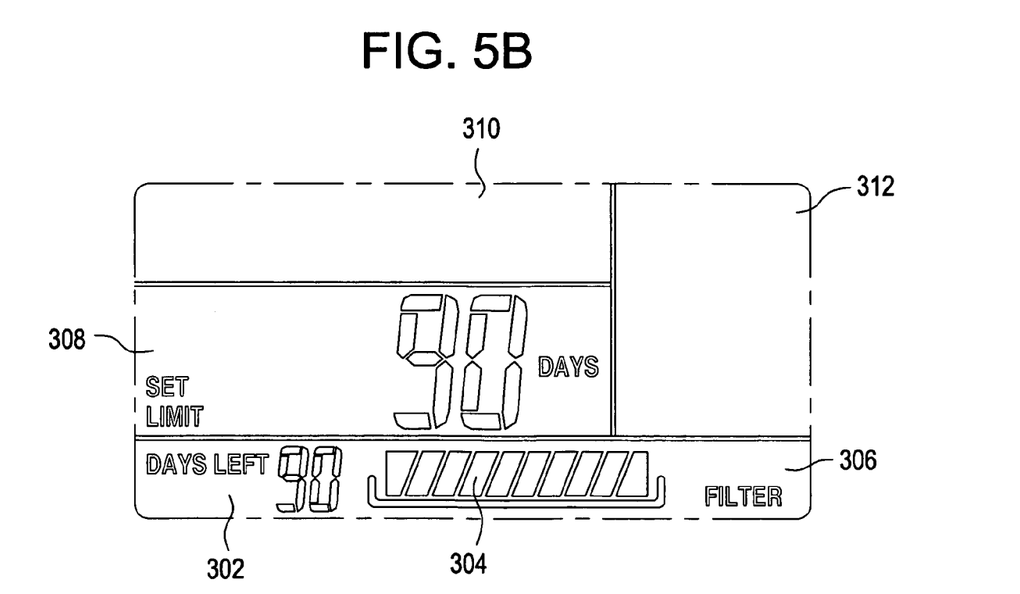

Display 106 may show the information indicated in FIG. 5(a), although the invention is not limited to this example. Indicator 306 may show that the thermostat is now in filter setting mode. The current time/temperature portion of the display may now be replaced with a SET LIMIT display 308 that indicates with the current FILTER USAGE LIMIT in days. The percentage of filter life remaining may be shown in bar indicator 304 and the number of days left shown at numerical indicator 302. PROGRAM section 310 and TEMP section 312 may be set blank in this mode to minimize any confusion of the user.

In this example, the default usage value is 90 days, but the invention is not limited thereto. The user may press and release [UP] or [DOWN] buttons 213 to scroll through a pre-set selection of choices. These selections may be displayed on numerical indicator 302 and SET LIMIT display 308, for example. Selecting a usage period may also reset bar indicator 304 to show 0% used.

Standard pre-set choices, based strictly on calendar days, irrespective of whether the fan is on or off, may include, for example, 0, 30, 60, 90, 120 or the like days, although the invention is not limited thereto. Such information can be shown on the system display. Programming controller 105 may allow for the user to select a custom usage period as well (e.g., 45 days) such as by depressing and holding a combination of button to incremented the usage counter to the desired number of days. Setting the filter usage limit to 0 days may be used to disable the filter usage counter.

The system of the invention may also be programmed to determine the filter usage time using a predetermined usage formula. In this embodiment, for example, the user may enter the rating of the filter (such as determined by the American Society of Healthcare Engineering, or ASHE). This rating is usually given in days or months. The automatic programming may calculate the filter usage time (e.g., in days or fan running time) using a formula such as the following:

$$\text{Filter Usage} = \frac{\text{Filter rating (days)} \times 24 \text{ hrs} \times (\text{Fan Daily Run Time (hrs)}/24 \text{ hrs})}{100}$$

Dividing by 100 allows a rounded number to be used. In this example, the fan run time may be a default estimated run time (e.g., 20 minutes per hour). Alternatively, the fan run time may be programmed by the user at the time the user selects the filter code. The system may also be programmed to determine the rating of the filter from the filter model number, such as by using a look-up table of model information or determining the rating directly from the model number itself. The usage meter may also thus reflect the filter usage in a user selected number of days, as discussed above, or based upon the programmed or estimated running time of the fan.

In a preferred form, the system is designed to allow the user to scroll through a list of available filter codes to select an appropriate code that corresponds to a particular filter number assigned to the filter in use at that time. The life of the filter is automatically programmed into the system based on the manufacturer's filter code once a particular selection from those available is made without use of the formula.

The user may also reset the counter to its default value or to restore a previous count using a combination of buttons 213. Those of ordinary skill in the art will appreciate that the invention is not particularly limited in this manner. Once the user is finished setting the usage counter, he or she may then switch the thermostat to another mode, such as RUN mode for operation, or one of the time or temperature setting modes.

The filter usage may also be programmed based upon a direct or indirect measurement of the actual use of the filter. This may be further explained in connection with FIG. 6, which illustrates one sample embodiment of an air handling portion of an environmental control system. Those of ordinary skill in the art will appreciate that this example is for purposes of illustration only and that the system of the invention may be used with any temperature control system or configuration.

Figure 6:
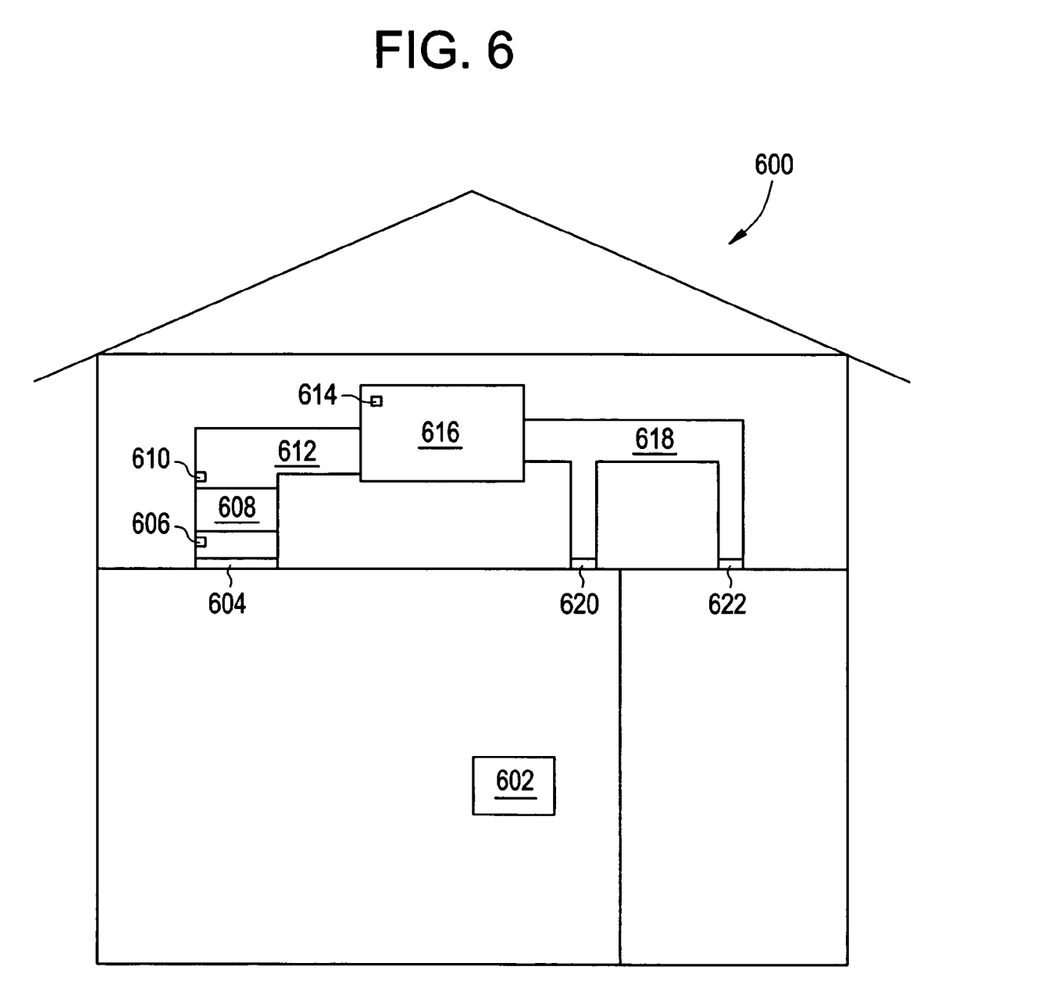
FIG. 6 is an illustration of an air handling system of an environmental control system in accordance with aspects of the invention.

In this example, environmental control system 600 may include thermostat 602, which is used to detect and control the temperature in one or more rooms throughout the structure. Air is circulated around the system by blower (fan) 616. Thermostat 602 and fan 616 may also be in communication with one or more heating/cooling apparatus, as is well known to those of ordinary skill in the art.

Fan 616 circulates air through supply duct 618, which is vented into each room through one or more registers 620, 622. In the embodiment shown, air is circulated back to fan 616 using a common return 604. The returning air passes through an a filter 608 and return duct 612 back to fan 616.

One or more sensors 606, 610, and/or 614 may be used to sense various characteristics of the system. For example, sensors 610 and 606 may be used to measure changes in air pressure on either side of air filter 608. In such an embodiment, the system of the invention may be programmed to sample an actual pressure differential when a filter is first changed or installed. Alternatively, a single sensor 610 may be used with its value compared against standard air pressure. In this embodiment sensors 606 and/or 610 may comprise any sensing element capable of detecting changes in air pressure such as diaphragms and the like.

Information from the sensors may be communicated back to thermostat 602, where programming device 104 (FIG. 1) may use this information to determine the usage time left for the filter for display 106 (FIG. 1). For example, programming device 104 may include a formula for estimating the usage life of a filter based upon changes to air pressure on the downstream side of the filter due to the buildup of particulates in the filter in a manner similar to the formula discussed above. The usage period may change based upon the rating or model of the filter (as may be inputted by the user). Alternatively, the sensor may incorporate a go/no-go switch or other mechanism that determines the usage period left and communicates this information to the thermostat. The sensor may also contain a reset switch to reset the characteristic information for the air circulating system back to a default value such as when the filter is changed.

In another embodiment, sensors 606 and/or 610 may measure airflow in the system and programming device 104 (FIG. 1) may calculate filter usage from the airflow measurements. As with the air pressure calculation, a formula may be used to determine the usage period of the filter. Also, as with the air pressure sensor, any sensor capable of measuring air flow may be used. For example, the air flow sensor may comprise mechanical sensors (e.g., "pin wheel" type sensors) or electronic heat loss sensing elements. The invention is not limited.

In yet another embodiment, the filter usage may be measured indirectly as well such as by measuring the fan usage. This may be accomplished, for example, by incorporating sensor 614 to sense the operation of fan 616 and communicating this information to thermostat 602. For example, sensor 614 may sense the current draw and/or power usage of fan 616. This may be accomplished using any number of well known current/power sensors. Programming device 104 (FIG. 1) may use the information received from sensor 614, along with the fan programming information and filter rating/model information, to calculate the usage period of the filter using a formula similar to the one discussed above.

The filter usage may also be based strictly on Fan Run Time only. This means that usage will only be accounted if the fan is in the "RUN" state. Various increments may be selected to determine trigger points for displaying the time for filter change. Such usage based on Fan Run Time can be the equivalent of a selected number of calendar days or any other basis. Also, the system may be able to display that filter usage is based on Fan Run Time only, any set times and the actual usage time at any given point.

While the invention as disclosed herein has been described in relation to specific embodiments thereof, it is understood that the invention is not limited to the particular embodiment disclosed herein, but only as set forth in the appended claims. It will be appreciated that various components known to those of skill in the art may be substituted for those described herein without departing from the spirit and scope of the invention as set forth in the appended claims. For example, the input device may include a pressure keypad or a series of contact switches instead of the pressure switches disclosed herein. The display device may also include an LED display or other illuminated display mechanisms or any of a number of conventional mechanical display mechanisms such as gauges or the like. The invention may be used in connection with any device that controls temperature.

What is claimed is:

1. A programmable temperature control apparatus for the control of temperature in communication with a temperature-modifying device and an air circulating system comprising:
   a user-operable input connected for entering air filter duration input information;
   a controller programmed to control a thermal output of said temperature-modifying device to achieve a desired temperature, and generate air filter duration output information based upon said air filter duration input information entered at said user-operable input and the length of time that said air circulating system has operated subsequent to resetting prior air filter duration output information; and
   a display for displaying said air filter duration output information.

2. The apparatus of claim 1, wherein said length of time comprises a run time period that is one or more selected from the group consisting of 0 days, 30 days, 60 days, 90 days, and 120 days.

3. The apparatus of claim 1, wherein said air filter duration output information comprises one or more selected from the group consisting of how much time remains in said run time period, what percentage of said run time period remains, and whether said air filter should be checked.

4. The apparatus of claim 3, wherein said remaining time is represented in days.

5. The apparatus of claim 3, wherein said percentage is represented using a bar indicator.

6. A programmable temperature control apparatus for the control of temperature in communication with a temperature-modifying device and an air circulating system comprising:
   a user-operable input connected for entering air filter duration input information;
   a controller operatively connected to said temperature-modifying device and programmed to control a thermal output of said temperature-modifying device to achieve a desired temperature, and to generate air filter output information based upon said air filter duration input information entered at said user-operable input and a length of time subsequent to resetting prior air filter duration output information; and
   a display for displaying said air filter output information during said control of said thermal output of said temperature-modifying device.

7. The apparatus of claim 6, wherein said air filter duration input information comprises a usage period that is one or more selected from the group consisting of 0 days, 30 days, 60 days, 90 days and 120 days.

8. The apparatus of claim 6, wherein said air filter output information comprises one or more selected from the group consisting of how much time remains in said air filter usage period, what percentage of said air filter usage period remains, and whether said air filter should be checked.

9. The apparatus of claim 8, wherein said remaining time is represented in days.

10. The apparatus of claim 8, wherein said percentage is represented using a bar indicator.

11. A programmable temperature control apparatus for the control of temperature in communication with a temperature-modifying device and an air circulating system comprising:
    a list of air filter identifiers;
    a user-operable input connected for selecting an air filter identifier from said list;
    a controller programmed to control a thermal output of said temperature-modifying device to achieve a desired temperature, and to generate air filter output information based upon said selected air filter identifier at said user-operable input; and
    a display for displaying said air filter output generation information during said control of said thermal output of said temperature-modifying device.

12. The apparatus of claim 11, wherein said air filter information comprises a usage period determined by a manufacturer of a filter corresponding to said air filter identifier.

13. The apparatus of claim 11, wherein said air filter output information comprises one or more selected from the group consisting of how much time remains in said air filter usage period, what percentage of said air filter usage period remains, and whether said air filter should be checked.

14. The apparatus of claim 13, wherein said time is represented in days.

15. The apparatus of claim 13, wherein said percentage is represented using a bar indicator.

16. The apparatus of claim 11, wherein said list of air filter identifiers comprises a multiplicity of manufacturer filter codes.

17. The apparatus of claim 11, wherein said list of air filter identifiers is changeable.

* * * * *